United States Patent
Lim et al.

(10) Patent No.: US 8,116,721 B2
(45) Date of Patent: Feb. 14, 2012

(54) APPARATUS AND METHOD TO PROVIDE URGENT CALL SERVICE IN A COMMUNICATION SYSTEM

(75) Inventors: Geun-Hwi Lim, Seongnam-si (KR); Jun-Hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1189 days.

(21) Appl. No.: 11/853,985

(22) Filed: Sep. 12, 2007

(65) Prior Publication Data

US 2008/0070545 A1    Mar. 20, 2008

(30) Foreign Application Priority Data

Sep. 18, 2006   (KR) .................. 10-2006-0090169

(51) Int. Cl.
*H04W 4/00*     (2009.01)
(52) U.S. Cl. ................. 455/404.1; 370/328; 370/331
(58) Field of Classification Search ............ 370/328, 370/331; 455/404.1
See application file for complete search history.

(56) References Cited

U.S. PATENT DOCUMENTS

| | | | | |
|---|---|---|---|---|
| 7,158,803 | B1 * | 1/2007 | Elliott | 455/512 |
| 2003/0233452 | A1 * | 12/2003 | Maufer et al. | 709/225 |
| 2005/0117539 | A1 * | 6/2005 | Song et al. | 370/328 |
| 2007/0258407 | A1 * | 11/2007 | Li et al. | 370/331 |

FOREIGN PATENT DOCUMENTS

| | | |
|---|---|---|
| KR | 10-2004-0093328 A | 11/2004 |
| KR | 10-2006-0009289 A | 1/2006 |

* cited by examiner

*Primary Examiner* — Pierre-Louis Desir
(74) *Attorney, Agent, or Firm* — Jefferson IP Law, LLP

(57) ABSTRACT

An apparatus and method for providing an urgent call service in a communication system are provided. A base station receives from a mobile station a message ranging request with a Medium Access Control (MAC) address in which a priority is set. If the priority set in the MAC address is a highest priority, the base station processes the message ranging request with the highest priority and provides the urgent call service to the mobile station. Upon detecting a request for the urgent call service, the mobile station sends a message ranging request to a base station using a Medium Access Control (MAC) address in which a highest priority is set, and receives the urgent call service in response to the message ranging request.

12 Claims, 5 Drawing Sheets

APPARATUS AND METHOD TO PROVIDE URGENT CALL SERVICE IN A COMMUNICATION SYSTEM

PRIORITY

This application claims the benefit under 35 U.S.C. §119 (a) of a Korean patent application filed in the Korean Intellectual Property Office on Sep. 18, 2006 and assigned Serial No. 2006-90169, the entire disclosure of which is hereby incorporated by reference.

BACKGROUND OF THE INVENTION

1. Field of the Invention

The present invention relates generally to a communication system. More particularly, present invention relates to an apparatus and method to provide an urgent call service in a communication system.

2. Description of the Related Art

Intensive researches on communication systems are now being conducted to provide users with high-speed services having various Quality-of-Service (QoS) classes. In particular, active researches in the communication systems are being performed to support a high-speed service in the way of guaranteeing mobility and QoS for a Broadband Wireless Access (BWA) communication system such as a wireless Local Area Network (LAN) system and a wireless Metropolitan Area Network (MAN) system.

Various emergency situations may arise due to disasters such as large-scale forest fires, typhoons and floods, or crimes such as terrorism and kidnapping. Accordingly, there is a need for a scheme of allowing the users in the emergency situations to cope with the emergency situations by using the communication system. In the emergency situations, the users should receive a call service within the shortest time by using their own terminals. Therefore, the communication system needs to provide an urgent call service to the terminals when an emergency situation happens to the users.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing an urgent call service in a communication system.

Another aspect of the present invention is to provide an urgent call service apparatus and method for notifying an emergency situation within the shortest time in a communication system.

According to an aspect of the present invention, a method for providing an urgent call service by a base station in a communication system is provided. The method includes receiving from a mobile station a message ranging request with a Medium Access Control (MAC) address in which a priority is set, and if the priority set in the MAC address is a highest priority, processing the message ranging request with the highest priority and providing the urgent call service to the mobile station.

According to another aspect of the present invention, a method for receiving an urgent call service by a mobile station in a communication system is provided. The method includes, upon detecting a request for the urgent call service, sending a message ranging request to a base station using a Medium Access Control (MAC) address in which a highest priority is set, and receiving the urgent call service in response to the message ranging request.

According to further another aspect of the present invention, an apparatus for providing an urgent call service in a communication system is provided. The apparatus includes a base station for receiving from a mobile station a message ranging request with a Medium Access Control (MAC) address in which a priority is set, and if the priority set in the MAC address is a highest priority, processing the message ranging request with the highest priority and providing the urgent call service to the mobile station.

According to yet another aspect of the present invention, an apparatus for receiving an urgent call service in a communication system is provided. The apparatus includes a mobile station for, upon detecting a request for the urgent call service, sending a message ranging request to a base station using a Medium Access Control (MAC) address in which a highest priority is set, and receiving the urgent call service in response to the message ranging request.

BRIEF DESCRIPTION OF THE DRAWINGS

The above and other aspects, features and advantages of certain exemplary embodiment of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

The present invention provides an apparatus and method for providing an urgent call service in a communication system. The present invention uses a Medium Access Control (MAC) address for the urgent call service between a transmitter, or Base Station (BS), and a receiver, or Mobile Station (MS), of the communication system. In addition, the present invention provides an apparatus and method for providing an urgent call service between a base station and a mobile station by processing a message ranging request with the highest priority upon receipt of the message ranging request. Therefore, the present invention can be applied to a Broadband Wireless Access (BWA) communication system, for example, an Institute of Electrical and Electronics Engineers (IEEE) 802.16 system, among the communication systems.

Figure 1:
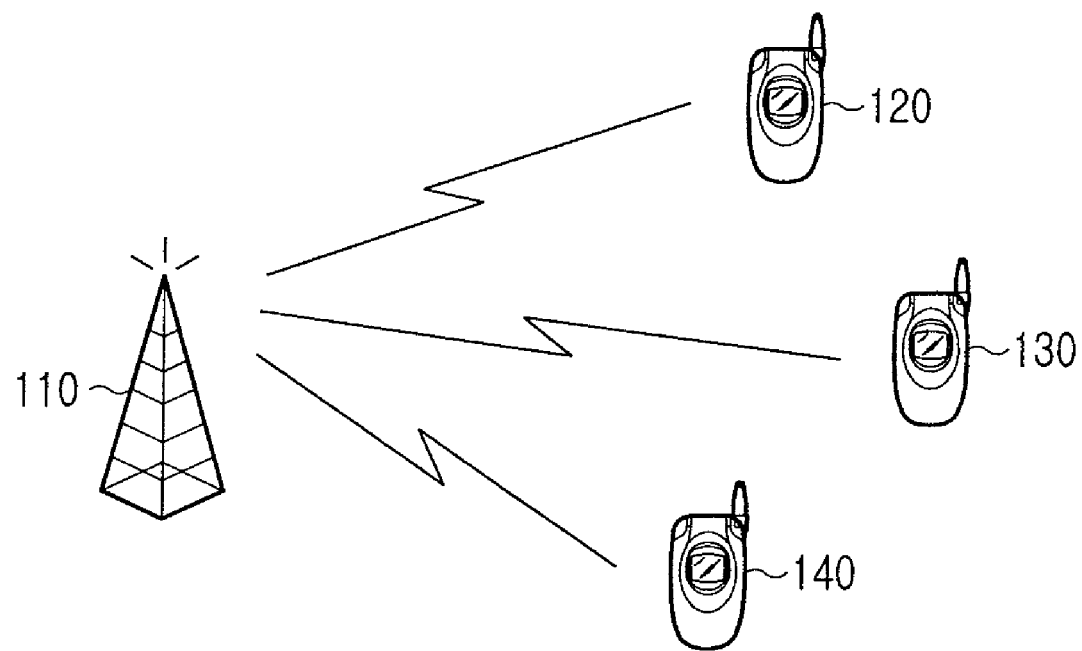
FIG. 1 is a schematic diagram illustrating a configuration of a communication system for supporting an urgent call service according to an exemplary embodiment of the present invention.

FIG. 1 is a schematic diagram illustrating a configuration of a communication system supporting an urgent call service according to an exemplary embodiment of the present invention.

Referring to FIG. 1, the communication system includes a base station 110 and mobile stations 120, 130 and 140 in communication with the base station 110.

The mobile stations 120, 130 and 140 perform an initial network entry procedure to communicate with the base station 110. The network entry procedure is generally divided into procedures of channel synchronization, ranging, capability negotiation, authentication, registration, service flow creation, etc.

When the mobile stations 120, 130 and 140 access the base station 110, the base station 110 may be in an overload state. In the overload state of the base station 110, the mobile stations 120, 130 and 140 may be assigned priority from the base station 110. The mobile stations 120, 130 and 140 are assigned priority in this manner, for example, when they use a Code Division Multiple Access (CDMA) code in a CDMA ranging procedure, when they use a MAC address in a message ranging procedure, or when they perform a capability negotiation and registration procedure.

The mobile station 120 is herein assumed to be a mobile station requesting an urgent call service due to occurrence of an emergency situation, among the mobile stations 120, 130 and 140. The term 'urgent call service' as used herein refers to a service for allowing a user of the mobile station 120 to request an urgent call or notify an emergency situation over a message when the emergency situation happens. For example, the urgent call service may include '119 Service' in South Korea, and '911 Service' in the United States.

The mobile station 120, compared to the other mobile stations 130 and 140, needs to access the base station 110 with higher priority to perform the urgent call service, and should be guaranteed fast access to the base station 110. In an exemplary implementation, the mobile station 120 uses a MAC address. It is assumed herein that the mobile station 120 acquires the highest priority to the base station 110 in the message ranging procedure and performs the urgent call service with the base station 110.

The mobile station 120 performs a network entry procedure to the communication system via the base station 110. In an exemplary implementation, the mobile station 120 is in an idle mode in which it is not in a communication state with the base station 110. The mobile station 120 receives a request for the urgent call service from its user through urgent call button or urgent call mode thereof. The mobile station 120 is waiting in the idle mode, and if there is a request for a call or the urgent call service, the mobile station 120 performs a ranging procedure, or a message ranging procedure, to the base station 110 to provide the urgent call service. An exemplary embodiment of the present invention provides the urgent call service to the user of the mobile station 120 by using a MAC address between the mobile station 120 and the base station 110.

Figure 2:
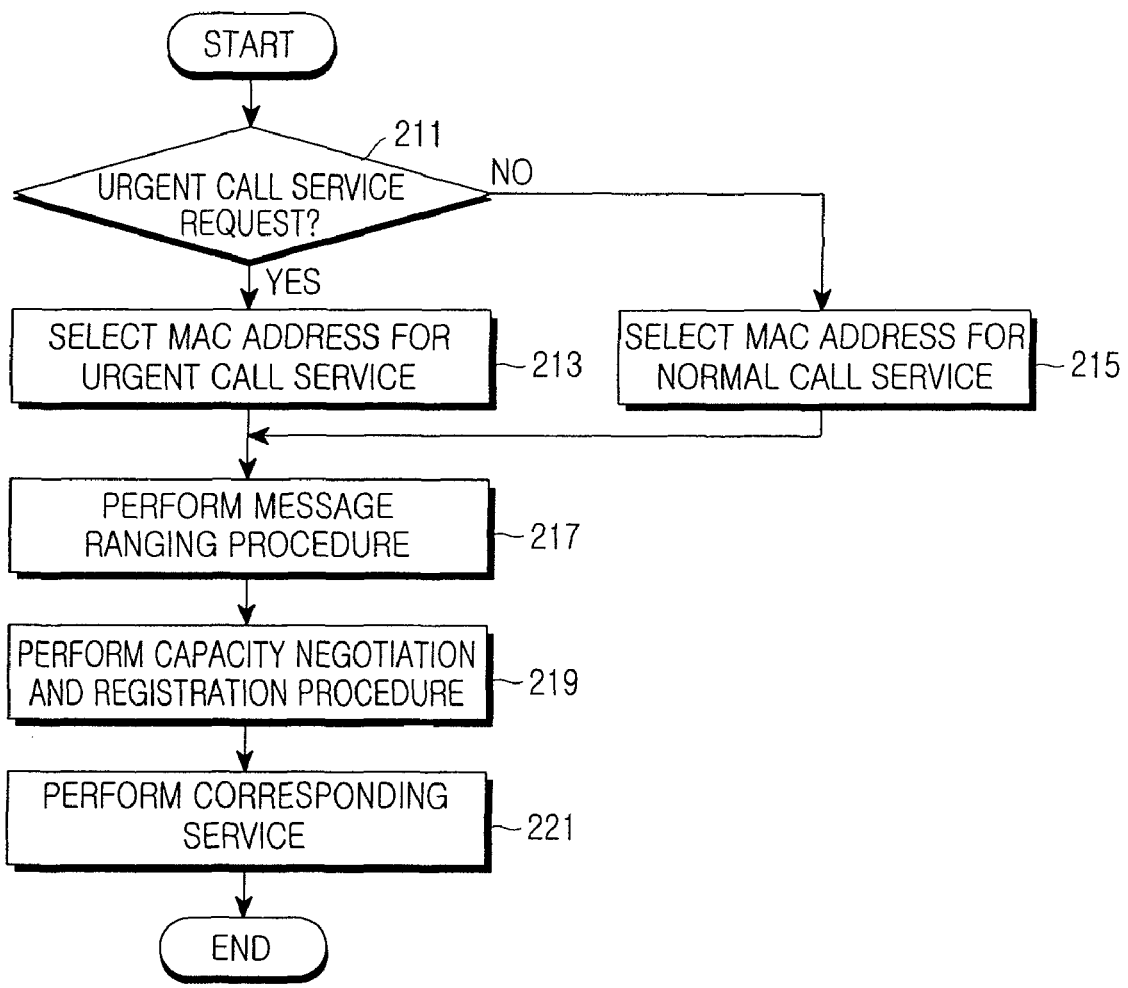
FIG. 2 is a flowchart illustrating an operation of a mobile station for receiving an urgent call service according to an exemplary embodiment of the present invention.
Figure 3:
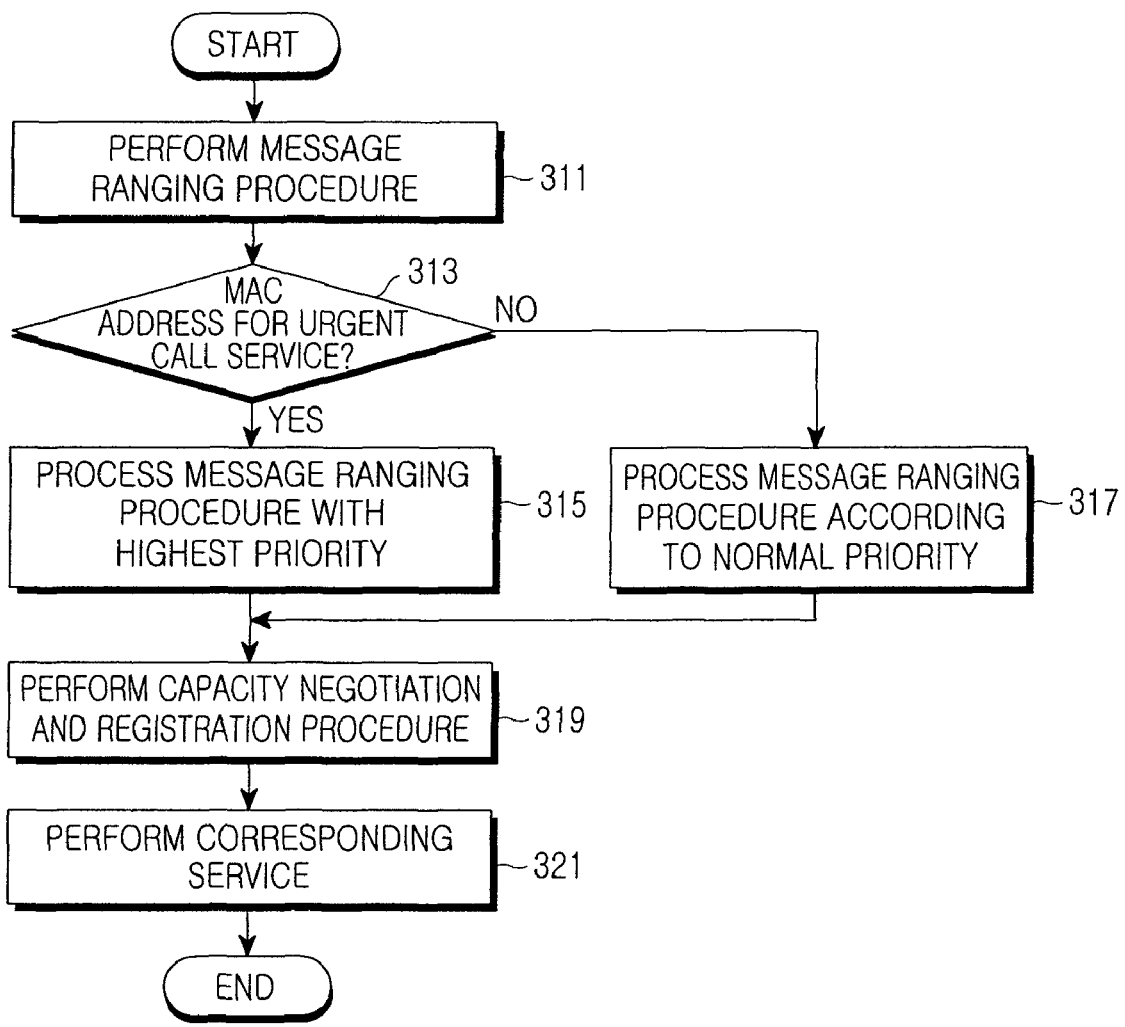
FIG. 3 is a flowchart illustrating an operation of a base station for providing an urgent call service according to an exemplary embodiment of the present invention.

In an exemplary communication system of the present invention, the base station 110 may allocate at least two MAC addresses to each mobile station to provide the urgent call service. The base station 110 may use one of the allocated MAC addresses as a MAC address for the urgent call service. With reference to FIGS. 2 and 3, a description will now be made of a method for providing an urgent call service between a mobile station and a base station using multiple MAC addresses.

FIG. 2 is a flowchart illustrating an operation of a mobile station for receiving an urgent call service according to an exemplary embodiment of the present invention.

Referring to FIG. 2, the mobile station determines in step 211 whether there is a request for an urgent call service. The mobile station herein determines whether it has received the urgent call service request from a user through an urgent call button or urgent call mode thereof. The mobile station may be allocated at least two MAC addresses from a base station. The mobile station may use one of the MAC addresses allocated to the mobile station, for the urgent call service.

If it is determined that the request signal received from the user is not the urgent call service request, the mobile station proceeds to step 215. In step 215, because the requested service is not the urgent call service, the mobile station selects a MAC address for a normal call service from among the MAC addresses allocated thereto, and then proceeds to step 217. The term 'normal call service' as used herein refers to general call services except for the urgent call service having the highest priority.

However, if it is determined that the mobile station has received a request for the urgent call service from the user in step 211, the mobile station proceeds to step 213 where it determines a MAC address for the urgent call service from among the MAC addresses allocated thereto.

In step 217, the mobile station performs a message ranging procedure to the base station using the determined MAC address, and then proceeds to step 219. The mobile station herein may perform a normal call service using a MAC address defined for the normal call service. In addition, the mobile station is assigned a priority from the base station for the urgent call service using the MAC address defined for the urgent call service.

After performing the message ranging procedure, the mobile station performs a capability negotiation and registration procedure with the base station in step 219, and then proceeds to step 221. For the capability negotiation procedure, the mobile station herein exchanges, for example, a Subscriber Station's Basic Capability Negotiation Request (SBC-REQ) message and a Subscriber Station's Basic Capability Negotiation Response (SBC-RSP) message with the base station. For the registration procedure, the mobile station exchanges, for example, a Registration Request (REG-REQ) message and a Registration Response (REG-RSP) message with the base station.

In step 221, the mobile station receives its requested service provided from the base station, and performs the corresponding service. That is, with the use of the MAC address defined for the normal call service, the mobile station may perform the normal call service with the base station. In addition, with the use of the MAC address defined for the urgent call service, the mobile station may perform the urgent call service with the base station.

The mobile station may use the MAC address for the urgent call service to receive the urgent call service from the base station, in the message ranging procedure. In this manner, the mobile station may receive the urgent call service from the base station with the highest priority.

FIG. 3 is a flowchart illustrating an operation of a base station for providing an urgent call service according to an exemplary embodiment of the present invention.

Referring to FIG. 3, if there is a message ranging request from a mobile station, the base station performs a message ranging procedure with the mobile station in step 311, and then proceeds to step 313. The base station herein may check the MAC address used by the mobile station during the message ranging procedure, through the message ranging procedure with the mobile station.

In step 313, the base station determines whether the MAC address checked in the message ranging procedure is a MAC address for the urgent call service. Herein, the MAC address is an address previously allocated to the mobile station by the base station, and the base station allocates a particular MAC address for the urgent call service. Therefore, the base station previously allocates at least two MAC addresses and transmits the allocated MAC address to the mobile station.

If it is determined that the MAC address is not a MAC address for the urgent call service, the base station proceeds to step 317 where it performs the message ranging procedure according to the normal priority, and then proceeds to step 319.

However, if it is determined that the MAC address is a MAC address for the urgent call service, the base station proceeds to step 315.

In step 315, the base station processes the corresponding message ranging procedure with the top priority or the highest priority, and then proceeds to step 319. Therefore, the base station may provide the urgent call service to the corresponding mobile station employing the MAC address for the urgent call service with the top priority. In addition, the base station assigns the highest priority to the corresponding mobile station even in its overload state, to provide the urgent call service.

After performing the message ranging procedure with the corresponding mobile station, the base station performs a capability negotiation and registration procedure with the mobile station in step 319, and then proceeds to step 321. The base station herein may perform the capability negotiation procedure by exchanging, for example, an SBC-REQ message and an SBC-RSP message with the mobile station, and may perform the registration procedure by exchanging, for example, an REG-REQ message and an REG-RSP message with the mobile station.

In step 321, the base station may provide the corresponding service to the mobile station. In this case, the base station provides the urgent call service to the mobile station upon receipt of a request for the urgent call service from the mobile station through the message ranging procedure, and provides the normal call service to the mobile station upon receipt of a request for the normal call service.

Figure 4:
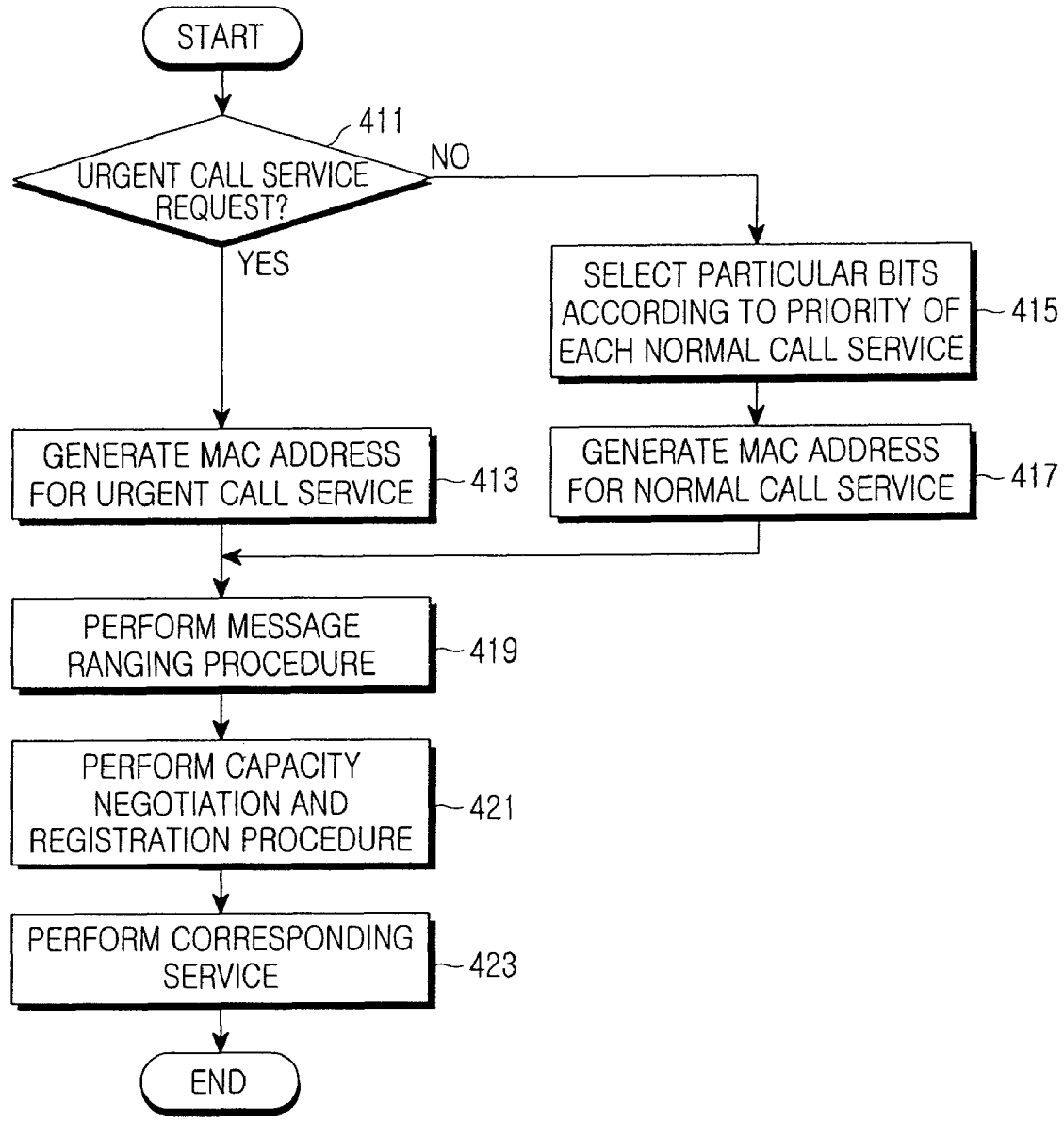
FIG. 4 is a flowchart illustrating an operation of a mobile station for receiving an urgent call service according to another exemplary embodiment of the present invention.
Figure 5:
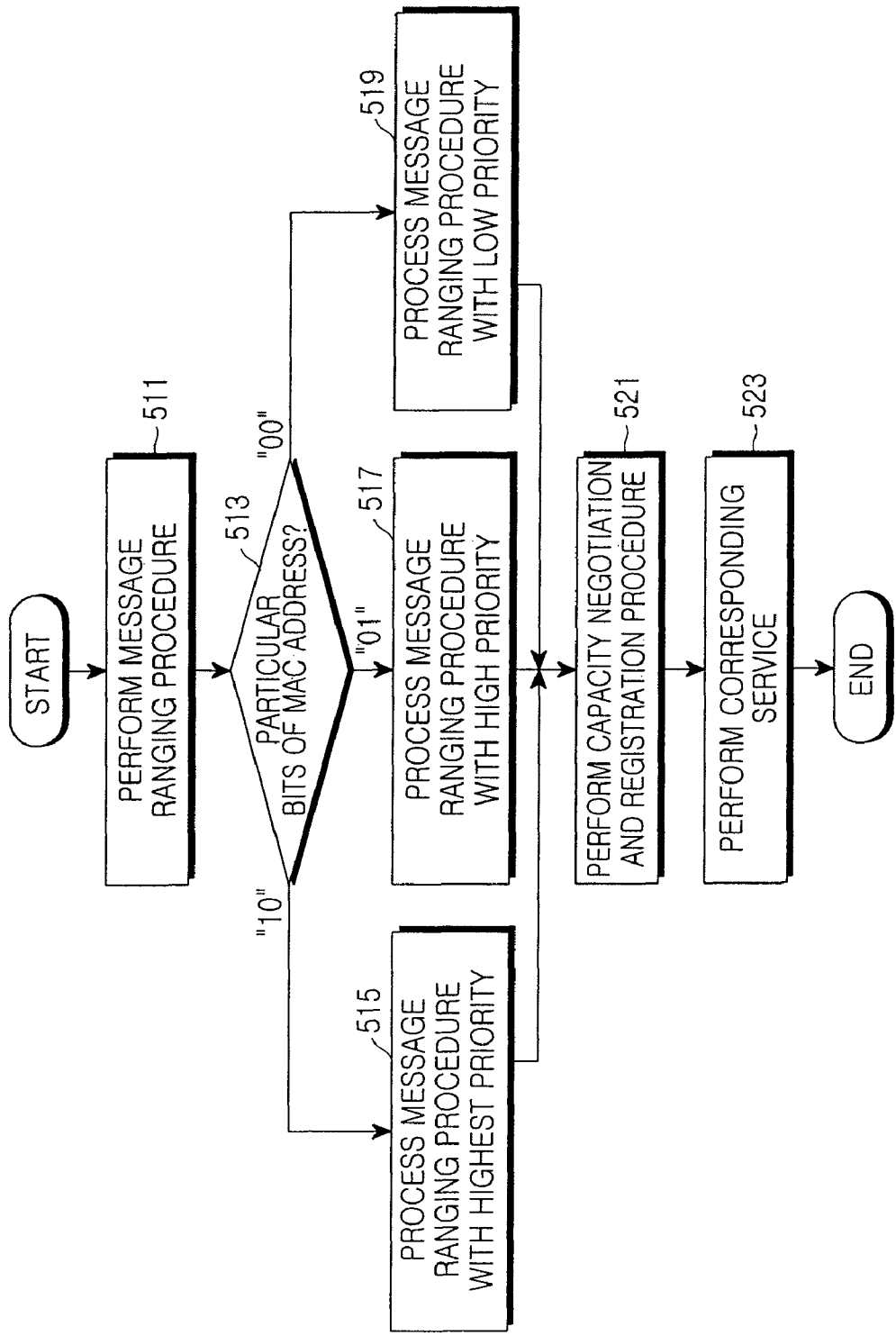
FIG. 5 is a flowchart illustrating an operation of a base station for providing an urgent call service according to another exemplary embodiment of the present invention.

The base station of the communication system may use particular bits of the MAC address as the MAC address for the urgent call service. With reference to FIGS. 4 and 5, a description will now be made of a method for providing an urgent call service between a mobile station and a base station using particular bits of the MAC address.

FIG. 4 is a flowchart illustrating an operation of a mobile station for receiving an urgent call service according to another exemplary embodiment of the present invention.

Referring to FIG. 4, the mobile station determines in step 411 whether there is a request for an urgent call service. The mobile station herein determines whether it has received the urgent call service request from its user through an urgent call button or urgent call mode thereof. The mobile station may use, as a priority thereof, a part of bits predetermined in a MAC address from a base station.

For a description of the urgent call service based on the MAC address, it will be assumed herein that the number of the predetermined bits is, for example, 2. The predetermined bits are parameters, values of which are variable according to system condition or user's setting. Similarly, as illustrated in FIG. 2, at least one MAC address including particular bits capable of priority indication may be assigned to each mobile station.

If it is determined that the request signal received from the user is not a request for the urgent call service, the mobile station proceeds to step 415 where it selects particular bits, for example, 2 bits, to be allocated to a MAC address thereof because the requested service is not the urgent call service. That is, the mobile station selects bits used for setting priority among normal call services, and then proceeds to step 417.

In step 417, the mobile station generates a MAC address for a normal call service, including the selected particular bits, and then proceeds to step 419. The selected particular bits herein refer to bit values, each of which is set for each priority, such as 1st priority, 2nd priority and 3rd priority, individually for each normal call service.

However, if it is determined that the mobile station has received a request for the urgent call service from the user, the mobile station proceeds to step 413 where it selects particular bits, for example, 2 bits, to be allocated to a MAC address thereof. That is, the mobile station selects bits for the urgent call service, generates a MAC address including the selected bits, and then proceeds to step 419.

In step 419, the mobile station performs a message ranging procedure using the generated MAC address including particular bits associated with each priority, and then proceeds to step 421. Herein, the mobile station, as it uses a MAC address defined for the urgent call service, may be allocated a higher priority from the base station for the urgent call service, compared to the normal call services.

After performing the message ranging procedure, the mobile station performs a capability negotiation and registration procedure with the base station in step 421, and then proceeds to step 423. As described in FIG. 2, for the capability negotiation procedure, the mobile station exchanges, for example, an SBC-REQ message and an SBC-RSP message with the base station, and for the registration procedure, the mobile station exchanges, for example, an REG-REQ message and an REG-RSP message with the base station.

In step 423, the mobile station receives its requested service provided from the base station, and performs the corresponding service. For the urgent call service, the mobile station herein performs message ranging for the urgent call service using particular bits included in the MAC address. In this manner, if there is a request for the urgent call service, the mobile station may receive the urgent call service from the base station with the highest priority. In addition, the mobile station may set priority not only for the urgent call service but also for the normal call services, and receive each of the normal call services according to the priority.

Table 1 illustrates a method in which the mobile station sets its priority using particular bits of the MAC address.

TABLE 1

| 2 bits (LSB) | Usage |
| --- | --- |
| 00 | Normal call service with low priority |
| 01 | Normal call service with high priority |
| 10 | Urgent call service |
| 11 | Reserved |

Referring to Table 1, when particular bits of the MAC address are set to '00', it indicates a low-priority normal call service. When the particular bits of the MAC address are set to '01', it indicates a high-priority normal call service. When the particular bits of the MAC address are set to '10', it indicates an urgent call service.

For example, 2 Least Significant Bit (LSB) bits of the MAC address may be used as the particular bits of the MAC address. Alternatively, the mobile station may set its priority using Most Significant Bit (MSB) bits or particular bits in a preset position of the MAC address, other than the LSB bits of the MAC address. In addition, the mobile station may set its priority by including preset bits in one of LSB, MSB and preset positions of the MAC address. With reference to FIG. 5, a description will now be made of a base station's operation of performing a message ranging procedure with the mobile station using bits of the MAC address.

FIG. 5 is a flowchart illustrating an operation of a base station for providing an urgent call service according to another exemplary embodiment of the present invention.

Referring to FIG. 5, if there is a message ranging request from a mobile station, the base station performs a message ranging procedure with the mobile station in step 511, and then proceeds to step 513. The base station may check a MAC address transmitted by the mobile station, through the message ranging procedure with the mobile station.

In step 513, the base station checks predetermined bits, or particular bits, in the MAC address checked in the message ranging procedure. In an exemplary implementation, the particular bits may be 2 LSB bits, and the base station checks the LSB bits.

If it is determined that the predetermined bits of the MAC address are set to '10' as illustrated in Table 1, the base station proceeds to step 515, considering that the mobile station requests the urgent call service. In step 515, the base station performs the ranging procedure with the highest priority because the message ranging procedure is for the urgent call service, and then proceeds to step 521.

If it is determined that the predetermined bits of the MAC address are set to '01', the base station proceeds to step 517, considering that the mobile station requests a high-priority normal call service. In step 517, the base station performs the ranging procedure with the second highest priority because the message ranging procedure is for the high-priority normal call service, and then proceeds to step 521.

If it is determined that the predetermined bits of the MAC address are set to '00', the base station proceeds to step 519, considering that the mobile station requests a low-priority normal call service. In step 519, the base station performs the ranging procedure with low priority because the message ranging procedure is for the low-priority normal call service, and then proceeds to step 521.

After performing the message ranging procedure with the corresponding mobile station, the base station performs a capability negotiation and registration procedure with the mobile station in step 521, and then proceeds to step 523. As described above, the base station may perform the capability negotiation procedure by exchanging, for example, an SBC-REQ message and an SBC-RSP message with the mobile station, and may perform the registration procedure by exchanging, for example, an REG-REQ message and an REG-RSP message with the mobile station.

In step 523, the base station may provide a corresponding service to the mobile station. In this case, the base station provides the urgent call service to the mobile station with the highest priority upon receipt of a request for the urgent call service from the mobile station through the message ranging procedure. The base station provides the normal call service to the mobile station with the priority assigned to the normal call service, upon receipt of a request for the normal call service.

In the forgoing case, the mobile stations each allocate a MAC address for message ranging. Alternatively, however, the base station may previously allocate the mobile stations as mobile stations for the urgent call service.

If there are 3 mobile stations as illustrated in FIG. 1, the base station may set a MAC address for an urgent call service to a first mobile station, set a MAC address for a high-priority normal call service to a second mobile station, and sent a MAC address for a low-priority normal call service to a third mobile station. As a result, each mobile station may have its unique MAC address.

Therefore, each mobile station may perform message ranging to the base station using its set MAC address. The base station may set a MAC address for each individual mobile station on a one-by-one basis using, for example, one of particular bits, MSB bits, and LSB bits of the MAC address, as described in FIGS. 4 and 5. For example, with the use of particular bits of the MAC address illustrated in Table 1, the base station may allocate a MAC address with the particular bits to each of the mobile stations to provide the urgent call service.

To this end, the mobile stations each may generate their unique MAC address, or may set the unique MAC address when they perform a power-on operation.

Therefore, even when the MAC address is used individually for the mobile station, the urgent call service may be previously assigned the highest priority and the normal call service may be previously assigned a high priority or a low priority. Therefore, it is possible to support not only the voice calls but also various data services individually for each mobile station according to the priority. In addition, the base station may allow a user requiring a high-quality service with a short response time, like the important business or stock exchanging, to use a high-priority mobile station, thereby preventing performance degradation of the mobile station due to overload of the network and thus meeting the demand for the high-quality service.

Although the exemplary embodiments of the present invention have been described for, for example, 3 priorities of the urgent call service and/or normal call services, the number of priorities may be extended with additional use of particular bits of the MAC address.

As is apparent from the foregoing description, the present invention may provide the urgent call service using a MAC address in the message ranging procedure of the communication system. Therefore, the present invention may provide the urgent call service capable of notifying the emergency situation within the shortest time in the communication system. Further, the present invention may provide the urgent call service as well as the normal call services taking their priorities into account.

While the invention has been illustrated and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing an urgent call service by a base station in a communication system, the method comprising:
    receiving from a mobile station a message ranging request with a Medium Access Control (MAC) address in which a priority is set;

if the priority set in the MAC address is a highest priority, processing the message ranging request with the highest priority and providing the urgent call service to the mobile station; and if the priority is set in the MAC address is lower than a priority of the urgent call service, processing the message ranging request according to the priority and providing a normal call service to the mobile station, wherein the MAC address comprises at least one bit in which a priority is set.

2. The method of claim 1, wherein the at least one bit is one of Most Significant Bit (MSB) bits and Least Significant Bit (LSB) bits.

3. The method of claim 2, further comprising:
allocating the MAC address to the mobile station.

4. A method for receiving an urgent call service by a mobile station in a communication system, the method comprising:
upon detecting a request for the urgent call service, sending a message ranging request to a base station using a Medium Access Control (MAC) address in which a highest priority is set;

receiving the urgent call service in response to the message ranging request;

upon detecting a request for a normal call service of the mobile station, sending a message ranging request to the base station according to a MAC address in which a priority lower that the priority of the urgent call service is set; and receiving a normal call service corresponding to the priority in response to the message ranging request, wherein the MAC address comprises at least one bit in which a priority is set.

5. The method of claim 4, wherein the at least one bit is one of Most Significant Bit (MSB) bits and Least Significant Bit (LSB) bits.

6. The method of claim 5, further comprising:
receiving the MAC address from the base station.

7. An apparatus for providing an urgent call service in a communication system, the apparatus comprising:
a base station for receiving from a mobile station a message ranging request with a Medium Access Control (MAC) address in which a priority is set, for determining if the priority set in the MAC address is a highest priority and for processing the message ranging request with the highest priority and for providing the urgent call service to the mobile station if the set priority is the highest priority, wherein if the priority set in the MAC address is lower than a priority of the urgent call service, the base station processes the message ranging request according to the priority and provides a normal call service to the mobile station, and wherein the MAC address comprises at least one bit on which a priority is set.

8. The apparatus of claim 7, wherein the at least one bit is one of Most Significant Bit (MSB) bits and Least Significant Bit (LSB) bits.

9. The apparatus of claim 8, wherein the base station allocates the MAC address to the mobile station.

10. An apparatus for receiving an urgent call service in a communication system, the apparatus comprising:
a mobile station for, upon detecting a request for the urgent call service, sending a message ranging request to a base station using a Medium Access Control (MAC) address in which a highest priority is set, and for receiving the urgent call service in response to the message ranging request, wherein upon detecting a request for a normal call service, the mobile station sends a message ranging request to the base station according to a MAC address in which a priority lower than the priority of the urgent call service is set, and receives a normal call service corresponding to the priority in response to the message ranging request, and wherein the MAN address comprises at least one bit in which a priority is set.

11. The apparatus of claim 10, wherein the at least one bit is one of Most Significant Bit (MSB) bits and Least Significant Bit (LSB) bits.

12. The apparatus of claim 11, wherein the mobile station receives the MAC address from the base station.

* * * * *